US012808710B1

(12) United States Patent
DeCicco

(10) Patent No.: US 12,808,710 B1
(45) Date of Patent: Nov. 24, 2026

(54) KITCHEN DEVICE THAT MEASURES AMOUNTS OF SOLIDS OR LIQUIDS ADDED TO A MIXTURE

(71) Applicant: FloMeasure, LLC, Awendaw, SC (US)

(72) Inventor: Brock DeCicco, Awendaw, SC (US)

(73) Assignee: FloMeasure, LLC, Awendaw, SC (US)

( * ) Notice: Subject to any disclaimer, the term of this patent is extended or adjusted under 35 U.S.C. 154(b) by 0 days.

(21) Appl. No.: 19/640,058

(22) Filed: Apr. 6, 2026

(51) Int. Cl.
*G01G 19/56* (2006.01)
*G01F 1/80* (2006.01)

(52) U.S. Cl.
CPC ............... *G01G 19/56* (2013.01); *G01F 1/80* (2013.01)

(58) Field of Classification Search
CPC ........ G01G 19/56; G01G 13/00; G01G 19/22; G01G 19/24; G01G 19/30; G01G 23/14; G01G 23/16; G01F 1/80; G01F 1/82; G01F 9/00; G01F 9/001; G01F 9/003; G01F 22/00
USPC .. 73/1.15, 149, 862.381, 862.541, 195, 227, 73/861.18–861.31, 861.77–861.84, 426, 73/432.1; 177/25.12–25.13, 26–29, 129, 177/132, 161, 162, 238, 239, 245, 264; 366/141, 142; 99/340, 342, 343, 352, 99/357, 483, 484, 487, 516, 646 LS; 7/110; 222/52, 58, 71, 77, 192, 630, 500; 141/83, 84, 98, 100–106, 250, 251, 258, 141/266, 311 R, 331, 332, 333, 363, 365
See application file for complete search history.

(56) References Cited

U.S. PATENT DOCUMENTS 4,840,239 A * 6/1989 Slagg ..................... G01G 19/24 177/25.14
7,762,714 B2 * 7/2010 Freeman .............. A01K 5/0216 73/434

FOREIGN PATENT DOCUMENTS

CN 106404134 A * 2/2017 ............. G01G 17/04
CN 105308421 B * 3/2018 ............. G01G 19/40
WO WO-2022118017 A1 * 6/2022 .............. A47J 36/32

* cited by examiner

*Primary Examiner* — Robert R Raevis
(74) *Attorney, Agent, or Firm* — ARC IP Law, PC; Joseph J. Mayo

(57) ABSTRACT

A measurement device that may be used in a kitchen, for example, to measure amounts of solid or liquid ingredients added directly to a mixture. The device may have a display that indicates precise quantities added. It may measure solids with a weight sensor integrated into the device base, and it may convert the weight of ingredients added to volumes. For liquids, the device may have a top arm that can be positioned over a container, with a channel through the arm into which a user pours liquids; the device may integrate measurements from a flow rate sensor in the channel to determine the total volume of liquid added. The flow channel may have geometric features to improve measurement accuracy under a variety of pouring conditions. Quantities added may be displayed in any desired units of measurement, which may be selected by the user or automatically selected by the device.

11 Claims, 11 Drawing Sheets

KITCHEN DEVICE THAT MEASURES AMOUNTS OF SOLIDS OR LIQUIDS ADDED TO A MIXTURE

BACKGROUND OF THE INVENTION

Field of the Invention

One or more embodiments of the invention are related to the field of measuring devices. More particularly, but not by way of limitation, one or more embodiments of the invention enable a kitchen device that measures the amounts of solids or liquids added to a mixture.

Description of the Related Art

Measurement of ingredients for cooking is typically performed using simple devices such as measuring cups or measuring spoons. It is often difficult to obtain highly accurate measurements with these devices. Moreover, users often need to repeatedly pour ingredients into the measuring device, stop, check, and then either continue to pour or remove ingredients if they have added too much. A device that continually measures ingredient quantities as they are added and that provides highly accurate measurements would significantly increase user convenience. In addition, with existing measuring devices users must pour ingredients into the measuring device (such as a measuring cup) and then pour from the measuring device into a mixing bowl or other food preparation. This multi-step process creates further inconvenience. A device that allows users to add ingredients directly to a mixing container and measures the ingredients directly as they are added would further increase user convenience.

For at least the limitations described above there is a need for a kitchen device that measures the amounts of solids or liquids added to a mixture.

BRIEF SUMMARY OF THE INVENTION

One or more embodiments described in the specification are related to a kitchen device that measures the amounts of solids or liquids added to a mixture.

One or more embodiments of the invention may include a base that supports a container containing a mixture, a weight sensor integrated into the base that measures the weight of the container and the mixture, a vertical support coupled to the base that extends upwards from the base, a movable arm coupled to the top of the vertical support that extends horizontally from the vertical support that can be extended over the container or retracted to clear space above the container, a channel through the movable arm, a flow rate sensor proximal to or integrated into the channel that measures a rate of flow of a liquid through the channel, a user interface, and a processor coupled to the weight sensor, the flow rate sensor, and the user interface. The processor measure a quantity of a solid added to the mixture by: receiving a selection of a material from the user interface, receiving an initial weight measurement from the weight sensor before the solid is added to the mixture, receiving a final weight measurement from the weight sensor after the solid is added to the mixture, calculating a weight change as a difference between the final weight measurement and the initial weight measurement, obtaining a density of the material from a memory coupled to the processor, calculating a volume of the solid added to the mixture based on the weight change and the density, and transmitting the volume of the solid added to the user interface. The processor may also measure a quantity of a liquid added to the mixture through the channel by: receiving a sequence of flow measurements over a time period from the flow rate sensor, calculate a volume of the liquid added to the mixture based on the sequence of flow measurements, and transmitting the volume of the liquid added to the user interface.

In one or more embodiments, the weight sensor may include a load cell.

In one or more embodiments, the flow rate sensor may include one or more of an ultrasonic flow sensor, a paddle-wheel flow sensor, and a turbine flow sensor.

In one or more embodiments, the vertical support may be extensible.

In one or more embodiments, the top section of the channel may include a funnel with a bottom funnel opening, and the flow rate sensor may be located below the bottom funnel opening.

In one or more embodiments, a cap may be located above the bottom funnel opening that deflects liquid poured towards the bottom funnel opening radially outward. There may be cap base that reduces the bottom funnel opening to an annular opening.

In one or more embodiments, there may be a chamber in the channel below the annular opening that equalizes pressure of the liquid in the chamber before the liquid continues in the channel towards the flow rate sensor.

In one or more embodiments, the bottom of the chamber may taper gradually to a pipe with a pipe diameter smaller than the diameter of the chamber, and the flow rate sensor may be located below the pipe.

In one or more embodiments, the processor may receive a unit of measure from the user interface, and it may convert the volume of liquid or solid added to this unit of measure.

BRIEF DESCRIPTION OF THE DRAWINGS

The above and other aspects, features and advantages of the invention will be more apparent from the following more particular description thereof, presented in conjunction with the following drawings wherein:

FIG. 1A shows the device configured to measure liquids, and FIG. 1B shows the device configured to measure solids.

FIG. 7A shows a cross-section view, and FIG. 7B shows an exploded view.

DETAILED DESCRIPTION OF THE INVENTION

A kitchen device that measures the amounts of solids or liquids added to a mixture will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention may enable measurement of a quantity of either liquid or solid that may be added into a mixture or into a container. An illustrative application of the invention may be as a kitchen device that simplifies food preparation by providing convenient measurement of ingredients regardless of the phases, forms, or materials of ingredients, and that allows users to add ingredients directly into a mixing container and obtain measurements, without using auxiliary containers such as measuring cups or measuring spoons.

Figure 1B:
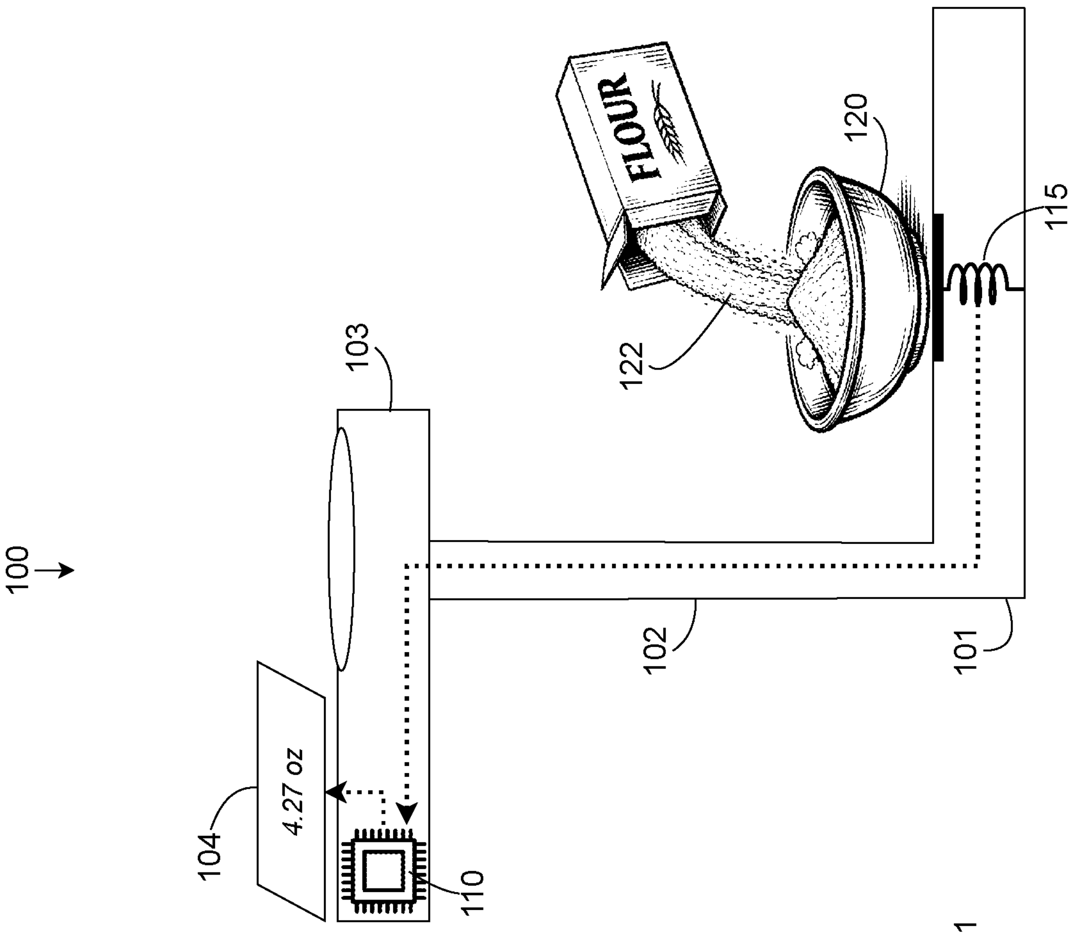
FIGS. 1A and 1B show architectural diagrams of an illustrative embodiment of a kitchen device that measures solids and liquids.
Figure 1A:
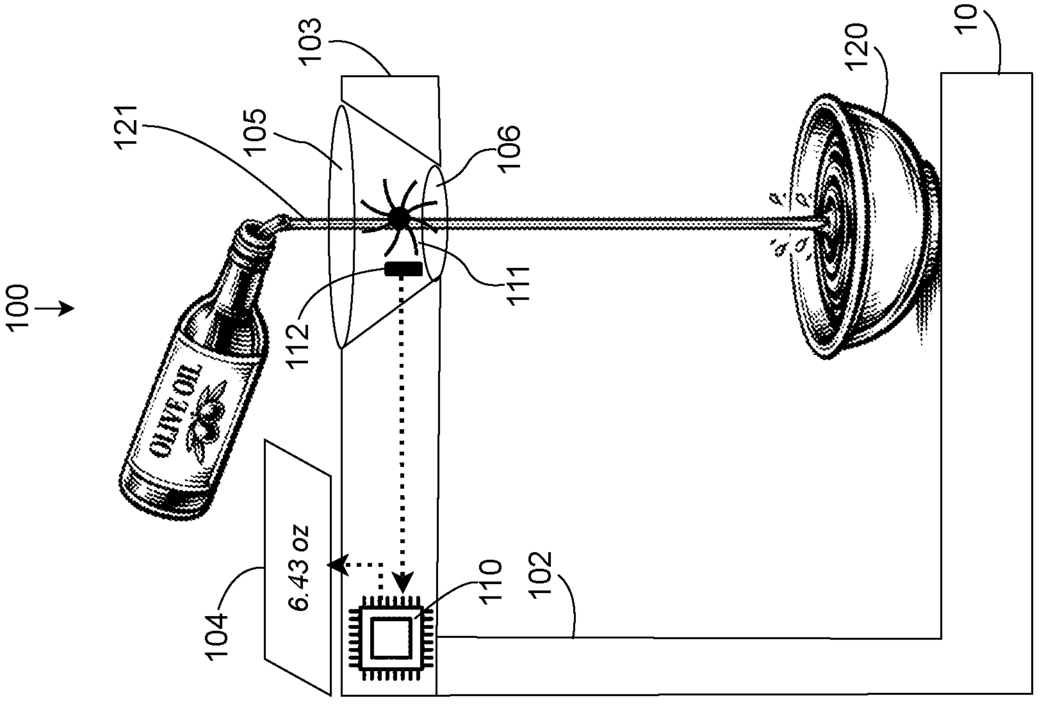

FIGS. 1A and 1B show conceptual block diagrams of an illustrative embodiment 100 of the invention; in FIG. 1A the device measures the amount of liquid 121 poured into container 120, and in FIG. 1B the device measures the amount of solid 122 added into container 120. Liquid 121 and solid 122 may be any types of materials, including but not limited to food ingredients such as olive oil and flour. Illustrative device 100 includes three structural elements: base 101 onto or into which a container or other item may be placed, a vertical support 102 that extends upwards from the base, and movable arm 103 attached to the top of the vertical support and extending horizontally from the vertical support. The movable arm 103 may be configured to be above the container or retracted to clear space above the container. Any of these three elements may contain electronic, electrical, and mechanical components that enable the device's measurement capabilities.

In FIG. 1A, the movable arm 103 is positioned above container 120, and liquid 121 is poured into an opening 105 in the top of the movable arm. There is a channel in the movable arm between the opening 105 and the bottom of the movable arm through which liquid flows. Below this opening, integrated into or proximal to the channel, may be a flow rate sensor that measures the rate of flow of liquid through the channel. Liquid then exits the channel through bottom opening 106 and flows into container 120. Any type of flow rate sensor may be used as a flow meter, including for example, without limitation, an ultrasonic flow sensor, a turbine flow sensor, or a paddlewheel flow sensor. FIG. 1A illustrates a paddlewheel type flow meter with a rotating wheel (rotor) 111 and a sensor 112 that tracks the motion of the wheel. Sensor 112 may use any technology or combination of technologies to detect the motion of the wheel, including for example, without limitation, magnetic, optical, ultrasound, or an encoder coupled to the wheel. Signals from sensor 112 are transmitted to a processor 110 that calculates the amount of liquid poured through the channel and displays this amount on user interface display 104. The processor and display may be located anywhere on device 100; the location shown in FIG. 1A with the display on the top and the processor inside movable arm 103 is illustrative. In one or more embodiments of the invention, device 100 may be coupled to an external user interface, such as a phone, for example via a wireless or cabled connection, and data may be shown on the external user interface instead of or in addition to the device's user interface. The device user interface display 104 may also receive input from the user, for example via a keypad or touchscreen.

Sensor 112 may be positioned to ensure that it is not adversely affected by the flow of liquid through the paddlewheel (or similar flow measurement device). For example, if sensor 112 is an optical sensor, it may be important to ensure that opaque liquids (e.g., milk) do not interfere with the optical sensor path, causing inconsistent pulse counts due to film buildup on the sensor faces for example. In one or more embodiments, the flow rate sensor may be recessed from the liquid flow path, angled relative to the flow direction, or shielded to reduce fouling of the sensor by opaque or viscous liquids.

In FIG. 1B, device 100 is used to measure the amount of solid 122 poured into container 120. This amount may be measured using for example a weight sensor 115 contained within the base 101. Because the solid is not poured through a channel in the movable arm (unlike liquids) but is instead measured directly using a sensor in the base, the movable arm 103 may be moved out of the way to facilitate access to the container 120. One or more embodiment of the device may allow the movable arm to be moved, for example to slide back to rotate away, or to flip up, down, or sideways, without compromising the functionality of the device. In the illustrative embodiment of FIG. 1B, movable arm 103 is pushed backwards (with opening 105 pushed toward vertical support 102) along a track within the vertical support. Weight sensor 115 may measure the weight of solid 122 added to the container (by measuring a change in weight) using any technology, such as strain gauges, or magnetic or capacitive sensors, for example. Signals from the weight sensor are transmitted to processor 110, which calculates the volume of material added to the container and shows this value on display 104. The processor may translate the weight reported by the weight sensor into volume using a known or estimated density for the material, as described below with respect to FIG. 8. This translation may be particularly useful for kitchen applications, where ingredient quantities are often stated in volumes rather than weights.

The illustrative device 100 provides at least three benefits compared to traditional low-tech measurement devices like measuring cups. First, quantities may be measured with very high precision, limited only by the precision of the sensors 112 and 115. Second, the user can observe quantities conveniently on user interface 104 while pouring ingredients directly into the container; the system may update the reported quantities at any update rate, such as 5 times per second, for example. The rapid update and immediate feedback lets users adjust quantities precisely to reach a desired amount. Third, the user does not need to use intermediate containers like measuring cups or measuring spoons to measure ingredients; instead, ingredients may be added directly to a mixing container and measured immediately and continuously as they are added.

Figure 2:
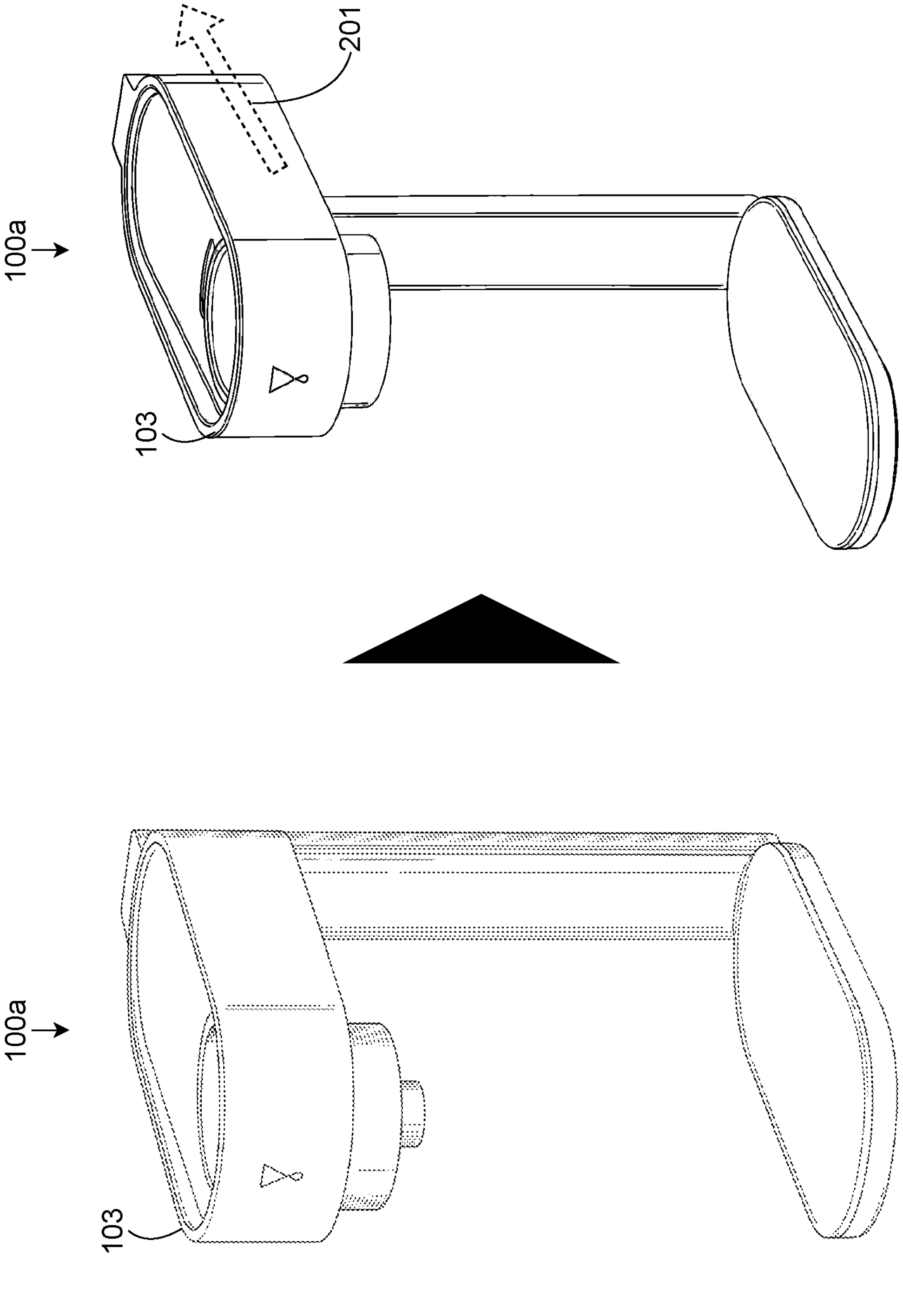
FIG. 2 shows two front views of an illustrative embodiment of the invention; on the left the device is configured to measure liquids, and on the right the top movable arm is pushed back to re-configure the device to measure solids.
Figure 3:
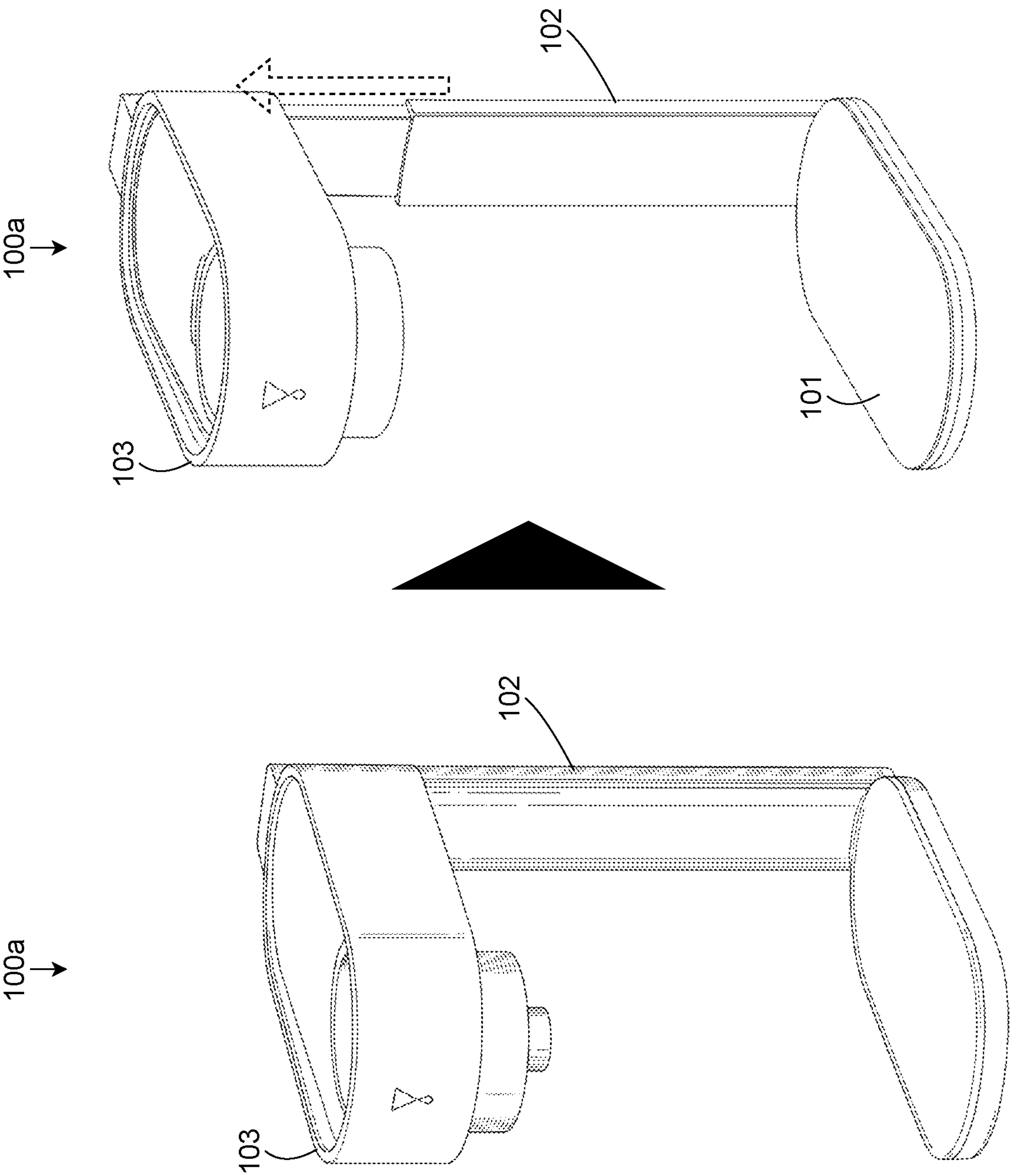
FIG. 3 illustrates extending the vertical support of the device upward, for example to accommodate larger containers.

FIG. 2 shows a front view of an illustrative embodiment of the invention 100*a*; the structure and internal components may correspond to those shown in FIGS. 1A and 1B. On the right side of FIG. 2 the movable arm 103 has been displaced with backward movement 201 to move it out of the way, as shown for example in FIG. 1B. FIG. 3 shows a different configuration adjustment that may be available in one or more embodiments of the invention: the vertical support 102 may be extensible, for example via a telescoping mechanism, to move movable arm 103 upwards, thereby creating a larger space between movable arm 103 and base 101. Extending the vertical support may allow the device to accommodate taller containers, for example.

Figure 4B:
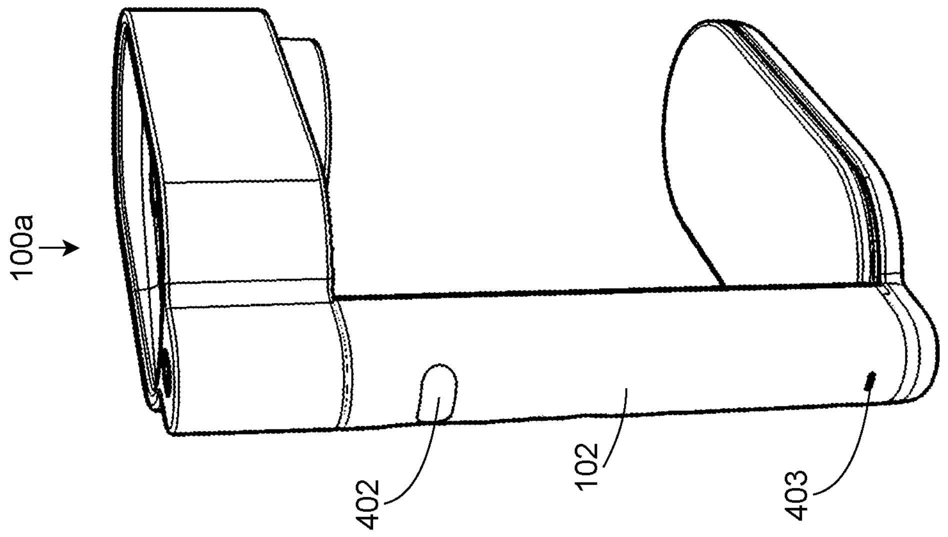
FIG. 4B shows a back view of the device.
Figure 4A:
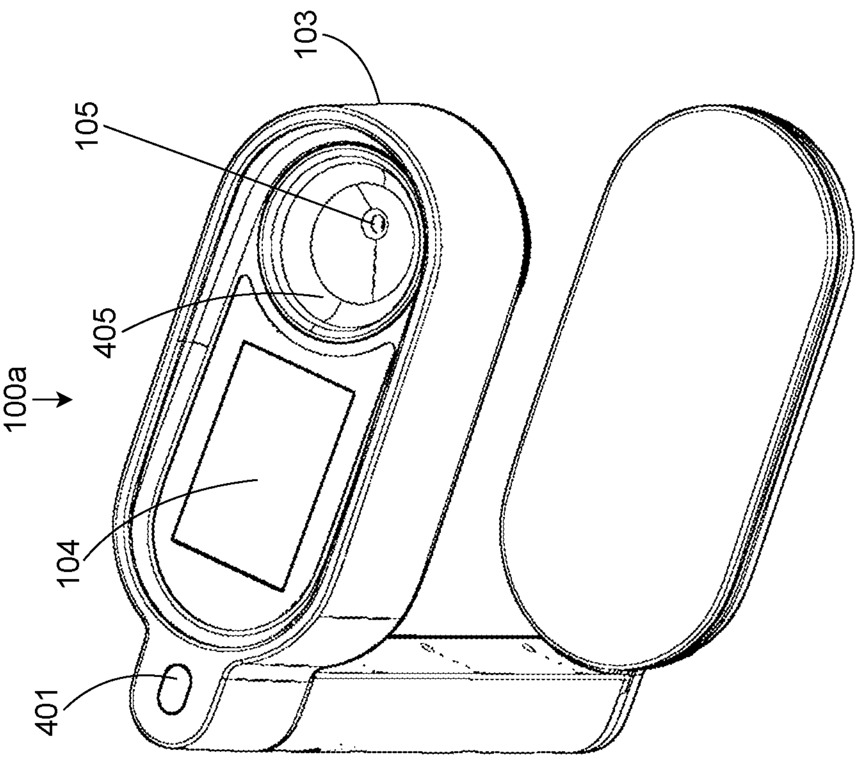
FIG. 4A shows a top view of the device of FIG. 2.

FIG. 4A shows a top view of illustrative embodiment 100*a*, illustrating user interface display 104 along the top surface of movable arm 103, and top opening 105 for liquid measurements. Opening 105 is at the bottom of a funnel 405 in this embodiment. Constricting the path for liquid flow to a relatively small cross section, using the small opening 105 at the bottom of the funnel, helps ensure that the liquid fills the entire cross-section as it flows through the device, which improves the accuracy of flow measurement. Button 401 may be a power on/off button, for example.

FIG. 4B shows a back view of illustrative embodiment 100*a*. Latch 402 is a release for the telescoping mechanism shown in FIG. 3. Port 403 may be a USB port or similar electronic interface port, for example, that may be used for charging a battery within the device and for transferring information to and from the device.

Figure 5B:
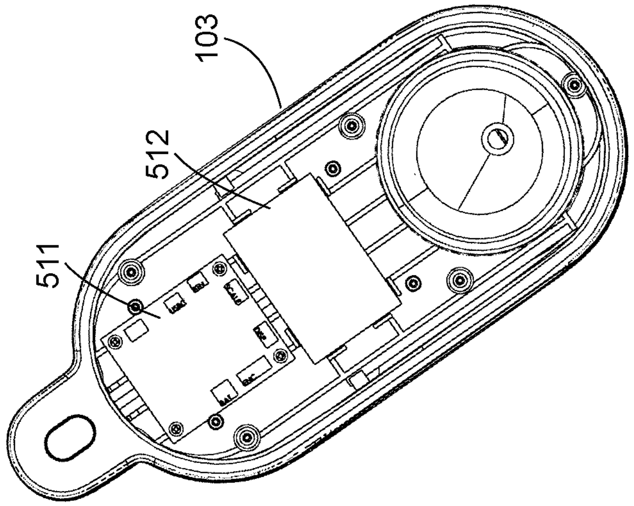
FIG. 5B shows the movable arm of the device with its cover plate removed to show the internal components, including a processor and a battery.
Figure 5A:
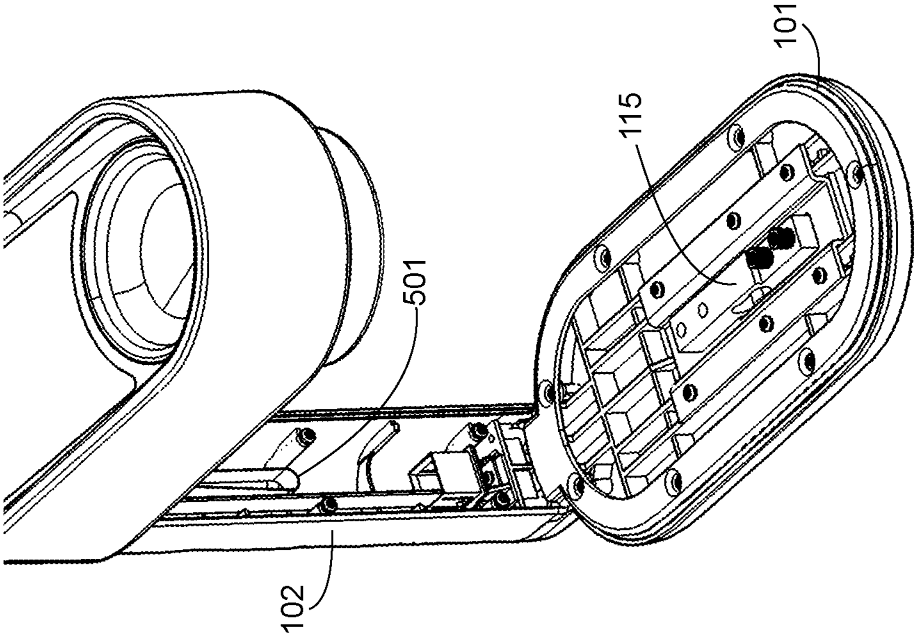
FIG. 5A shows the device of FIG. 2 with the top plate of the lower base element removed to show the internal components, including a weight sensor, and with the front plate of the vertical support removed to show the internal cabling.

FIG. 5A shows illustrative embodiment 100*a* with the top cover removed from base 101 to show the internal components, including weight sensor 115. It also shows the interior of vertical support 102, showing a ribbon cable 501 that transmits signals from weight sensor 115 to the processor in the upper element; this cable is folded so that it can accommodate extension of vertical support 102.

FIG. 5B shows a top view of illustrative embodiment 100*a* with the top cover removed from movable arm 103 to show internal components, including a PCB 511 that contains the processor, and a battery 512 that powers the device.

Figure 6:
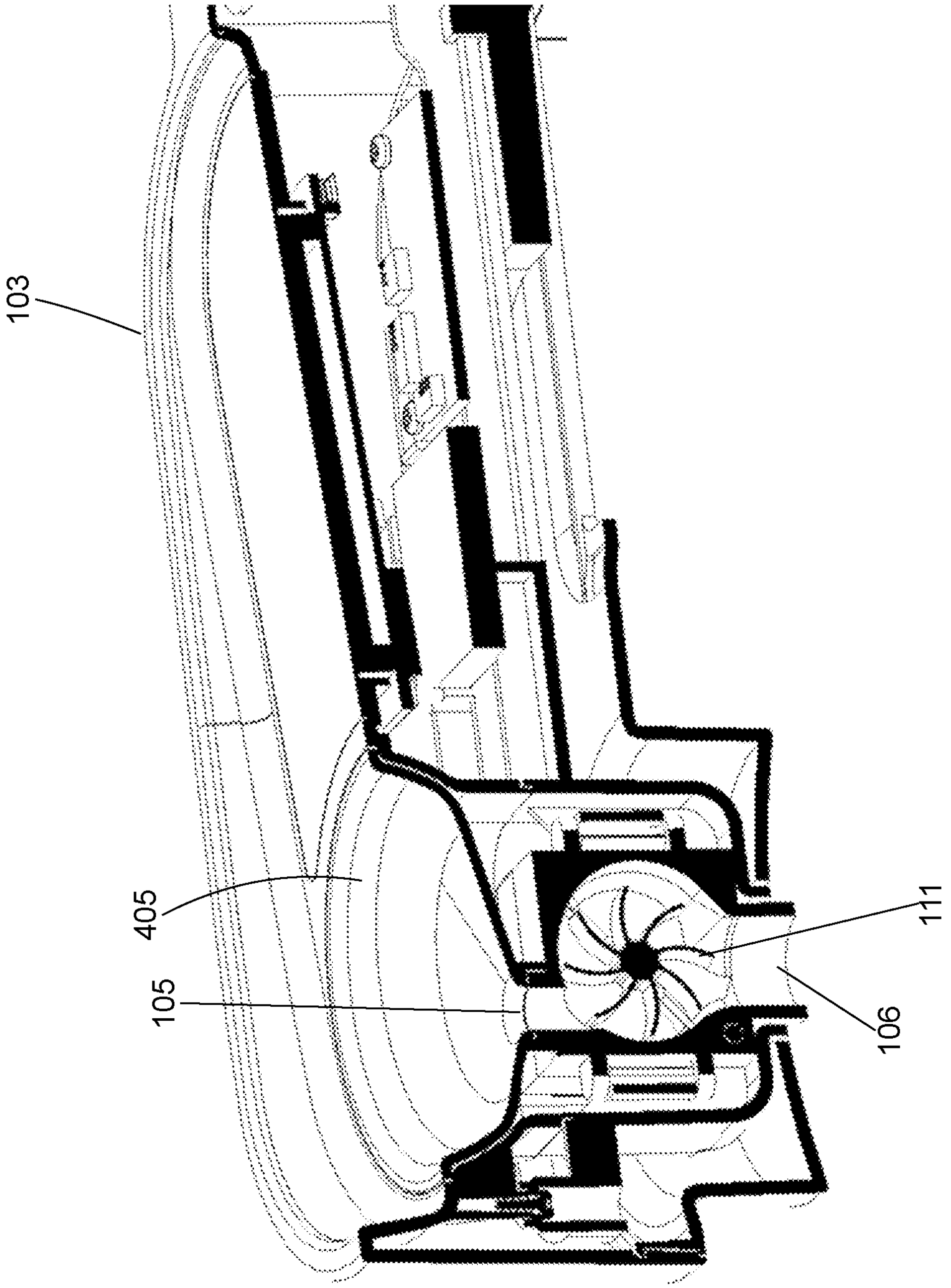
FIG. 6 shows a cross-section view of the movable arm of the device, illustrating the flow sensor located below the liquid funnel.

FIG. 6 shows a cross-section of movable arm 103 of illustrative embodiment 100*a*, showing the channel from opening 105 at the bottom of funnel 405, through a cavity within which paddlewheel 111 is located, and out through bottom opening 106.

To ensure accuracy of liquid flow measurement under a range of pouring conditions, one or more embodiments of the invention may include geometric features in or near the liquid flow channel that "condition" the flow to be relatively uniform regardless of how quickly or from where the user pours liquid into the funnel. These features may address three potential sources of error: (1) When a user pours quickly enough to fill the funnel, a full column of liquid creates elevated gravity-driven head pressure above the paddlewheel inlet. This drives liquid through the rotor at a higher velocity than a steady pour of the same volume. The rotor spins faster but the increased velocity is not proportional to volume. The result is a systematically low measurement. The faster the flood, the worse the undershoot. (2) When a stream enters the inlet centered and on-axis, the concentrated jet drives the rotor harder than a distributed flow of the same total volume. The rotor accumulates excess angular momentum and the measurement overshoots actual volume. This effect is amplified when a fast pour happens to be well-aimed. (3) The inlet is sensitive to where the user aims the stream and the width and shape of the pour. A user pouring from close range produces a narrow high-velocity stream. A user pouring from height produces a wider, slower stream. These variations cannot be calibrated away because they do not correlate with any measurable firmware signal.

Figure 7A:
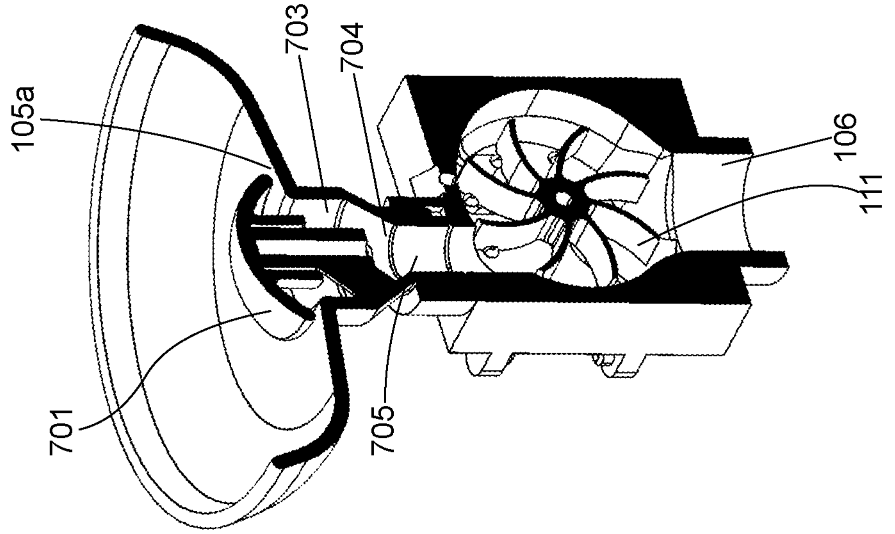
FIGS. 7A and 7B show a variation of the funnel of FIG. 6 that incorporates a flow conditioning element to regularize the flow rate of liquid through the flow sensor.
Figure 7B:
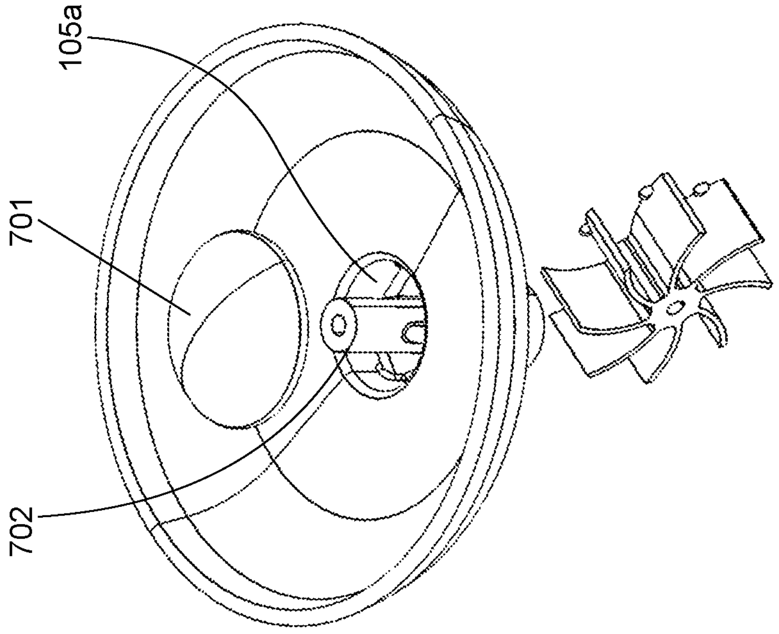

FIGS. 7A and 7B shows a variation of the channel geometry of FIG. 6 that may improve flow conditioning, thereby addressing the issues identified above; FIG. 7A shows a cross-section view of the modified channel, and FIG. 7B shows an exploded view. First, a "mushroom" cap 701 is placed at the center of the opening at the bottom of the funnel; poured liquid hitting the cap is forced to the edge of the cap, where it then flows through the remaining annular opening 105*a* between the edge of the opening and the base 702 on which the cap 701 rests. The annular gap formed by the mushroom cap forces all liquid to travel radially outward to the perimeter before passing through the restriction. This eliminates the direct jet path entirely. No stream, regardless of aim or velocity, can reach the paddlewheel without first being redirected circumferentially.

The annular gap also functions as a controlled orifice. Once the gap is the flow bottleneck, upstream head pressure becomes less influential because the gap limits maximum volumetric flow rate regardless of how much pressure builds above it. This directly caps the fast-fill variance.

Second, below annular gap 105*a* is a chamber 703 where liquid pressure equalizes. The annular gap converts chaotic inflow into a 360-degree curtain of liquid entering the chamber 703 from the perimeter. That curtain still carries radial momentum. Without a calm zone, the curtain would arrive at the paddlewheel throat with directional bias and non-uniform velocity distribution. The chamber provides space for the curtain to decelerate, equalize pressure radially, and lose directionality before the contraction. At a 4:1 area ratio for example (16 mm chamber vs. 8 mm throat), liquid velocity drops approximately 75% inside the chamber before re-acceleration. At low velocity, directional differences equalize rapidly. The chamber converts a directional curtain into a symmetric pressure reservoir.

Third, the bottom 704 of chamber 703 tapers gradually to a pipe 705 before it reaches the paddlewheel 111. Pipe 705 may have a smaller diameter than the chamber. The paddlewheel rotor responds to the velocity profile of fluid entering it, not just total flow rate. An abrupt step from chamber to throat would create flow separation and non-uniform velocity distribution across the rotor face. A smooth converging contraction accelerates flow uniformly, producing a symmetric velocity profile that drives all rotor blades evenly. This is what produces a linear and repeatable relationship between flow volume and the paddlewheel rotation.

Figure 8:
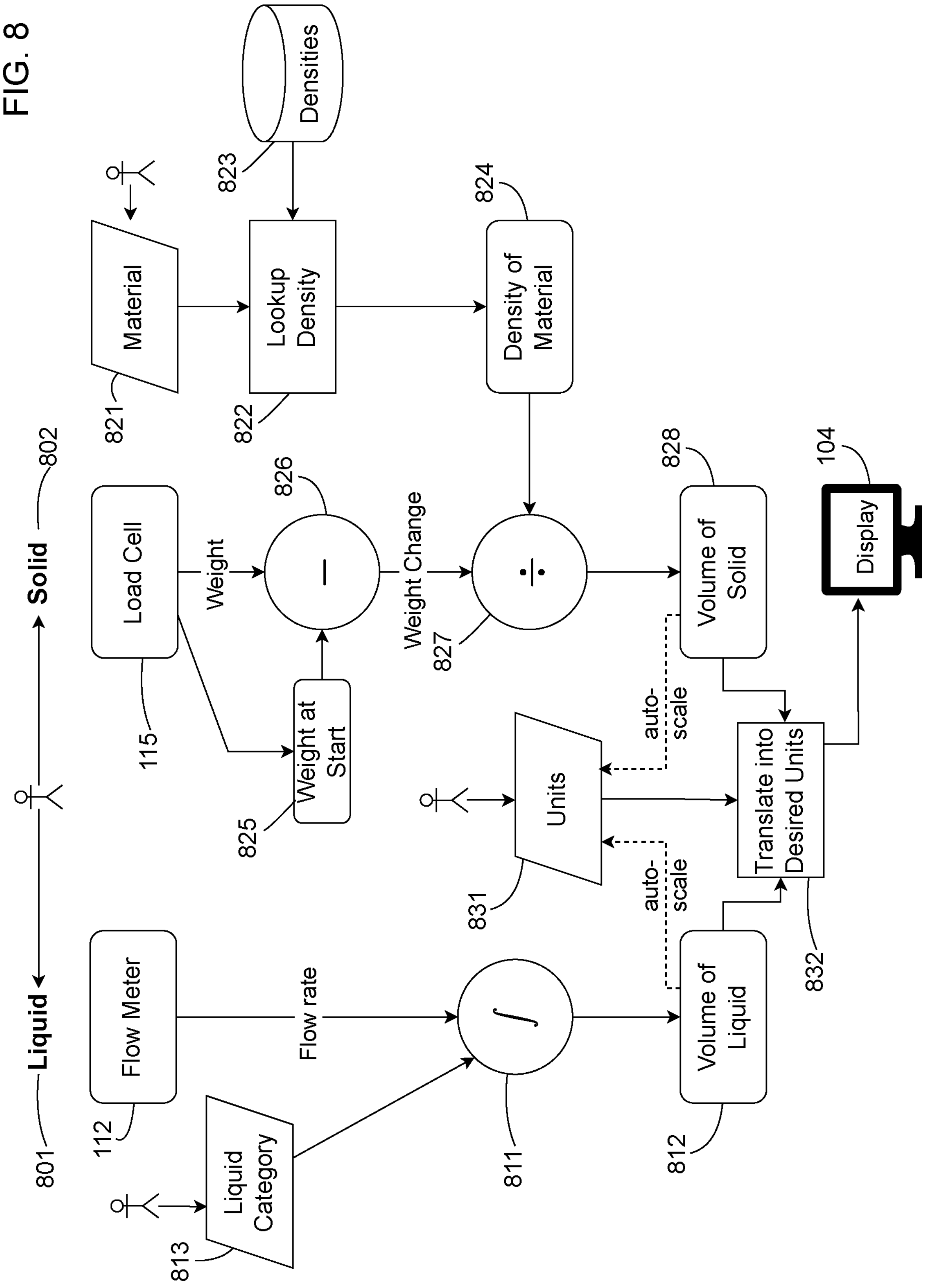
FIG. 8 is a flowchart of illustrative data processing steps performed by the device to calculate the amount of solid or liquid added through the device.

The processor embedded in the device converts signals from the sensors (such as the weight sensor and flow sensor) into quantity measurements for the user. FIG. 8 shows illustrative steps and data flows for this process. A user may first indicate whether the measurement is for liquids 801 or solids 802. For liquids, the flow rate from flow rate sensor 112 is integrated in step 811 over the time period of measurement to obtain the total volume 812 of liquid added. The processor may for example receive a sequence of flow rate measurements over time from the flow rate sensor, and numerically integrate this sequence (for example by summing the product of flow rate and time delta across the sequence) over the time period of the measurements to obtain the total volume 812. In some situations, it may be necessary or beneficial for a user to specify a liquid category 813, which may assist the device's firmware in integrating flow data into total volume. For example, the user may specify that the liquid added is water-like (low viscosity) or oil like (higher viscosity); this selection may be helpful since the flow rate sensor may respond somewhat differently to these two types of liquids, and therefore different calibration factors may be used to convert raw flow rate measurements into volumes.

The firmware or hardware of the device processor may apply various adjustments and calibrations to the raw data from the flow sensor. For example: (1) start/stop transient correction, where the processor detects the onset and cessation of flow and applies correction factors to compensate for rotor startup and coast-down behavior; (2) flow anomaly detection and correction, where the processor identifies anomalous tick patterns (e.g., slow pours causing extra counts, jet-induced overspeed) and applies correction; (3) rotor nonlinearity compensation, the processor applies a nonlinear calibration curve to map raw tick counts to volume, accounting for rotor response variation across flow rates.

For solids, the weight reported by weight sensor 115 before adding the solid ingredient(s) is stored in value 825. After adding some or all of the solid(s), the starting weight 825 is subtracted from the current weight from weight sensor 115 in step 826 to obtain the weight change. In many situations the user would prefer to see the volume of material added rather than its weight. To perform this calculation, the system asks the user to select the material 821 added and then performs lookup 822 of the material density 824 from a table of densities 823 stored in a memory accessible to the processor. The weight change is then divided by the density 824 in step 827 to yield the volume 828 of solid added. Finally, the volumes 812 or 828 may be converted to desired units 831 in step 832; the desired units may be selected by the user, or in some situations the device may automatically select appropriate units based on the volume or the material.

Figure 9:
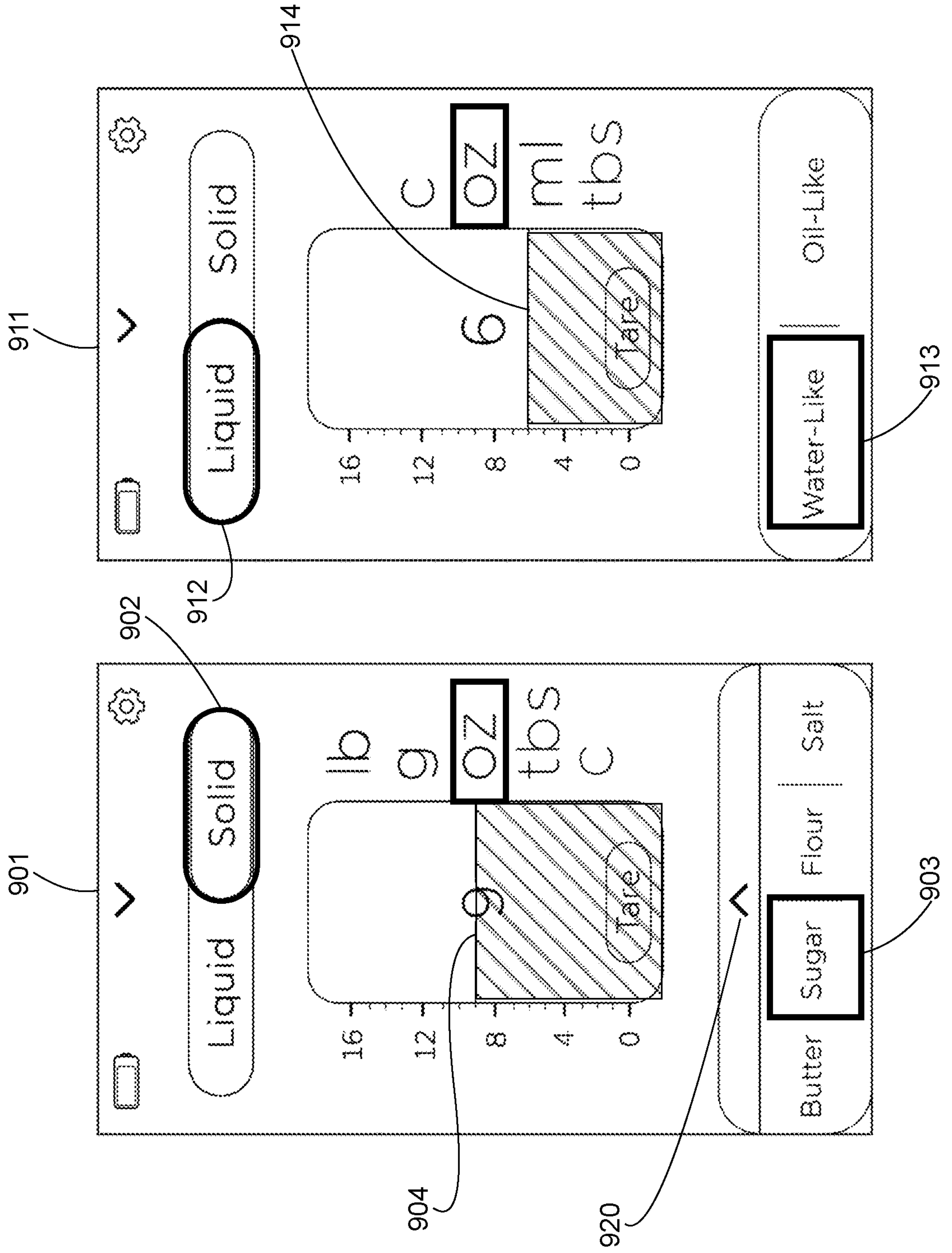
FIG. 9 shows illustrative user interface screens for solid and liquid measurement.
Figure 10:
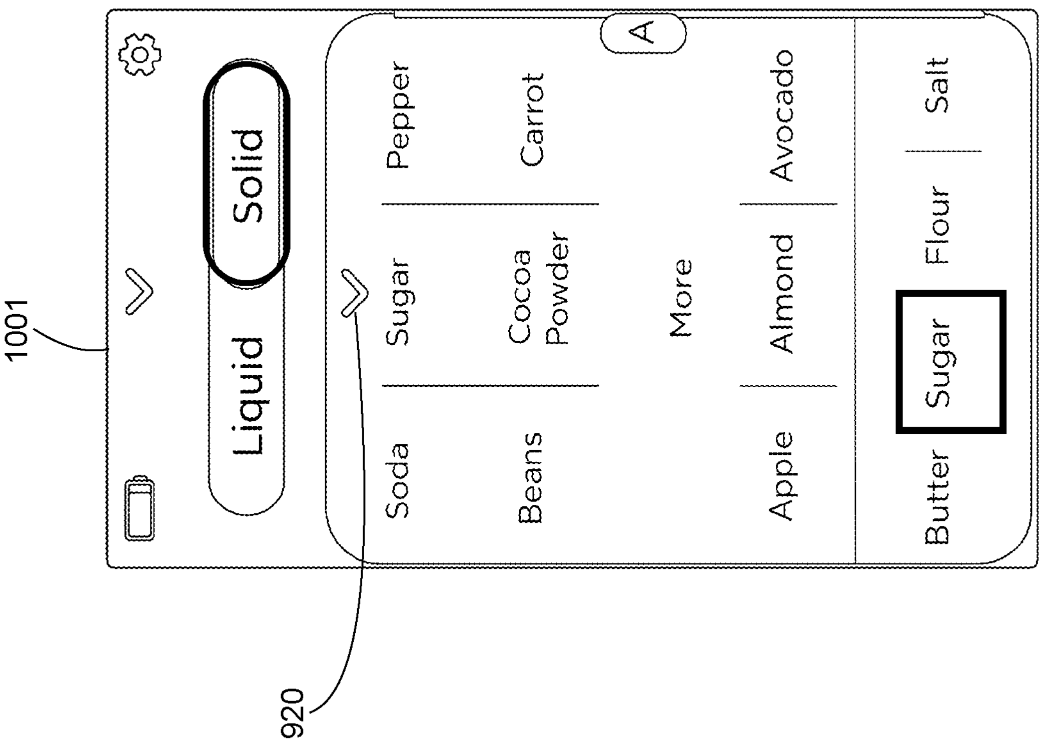
FIG. 10 shows an illustrative user interface screen for selection of a solid material to be measured.
Figure 11:
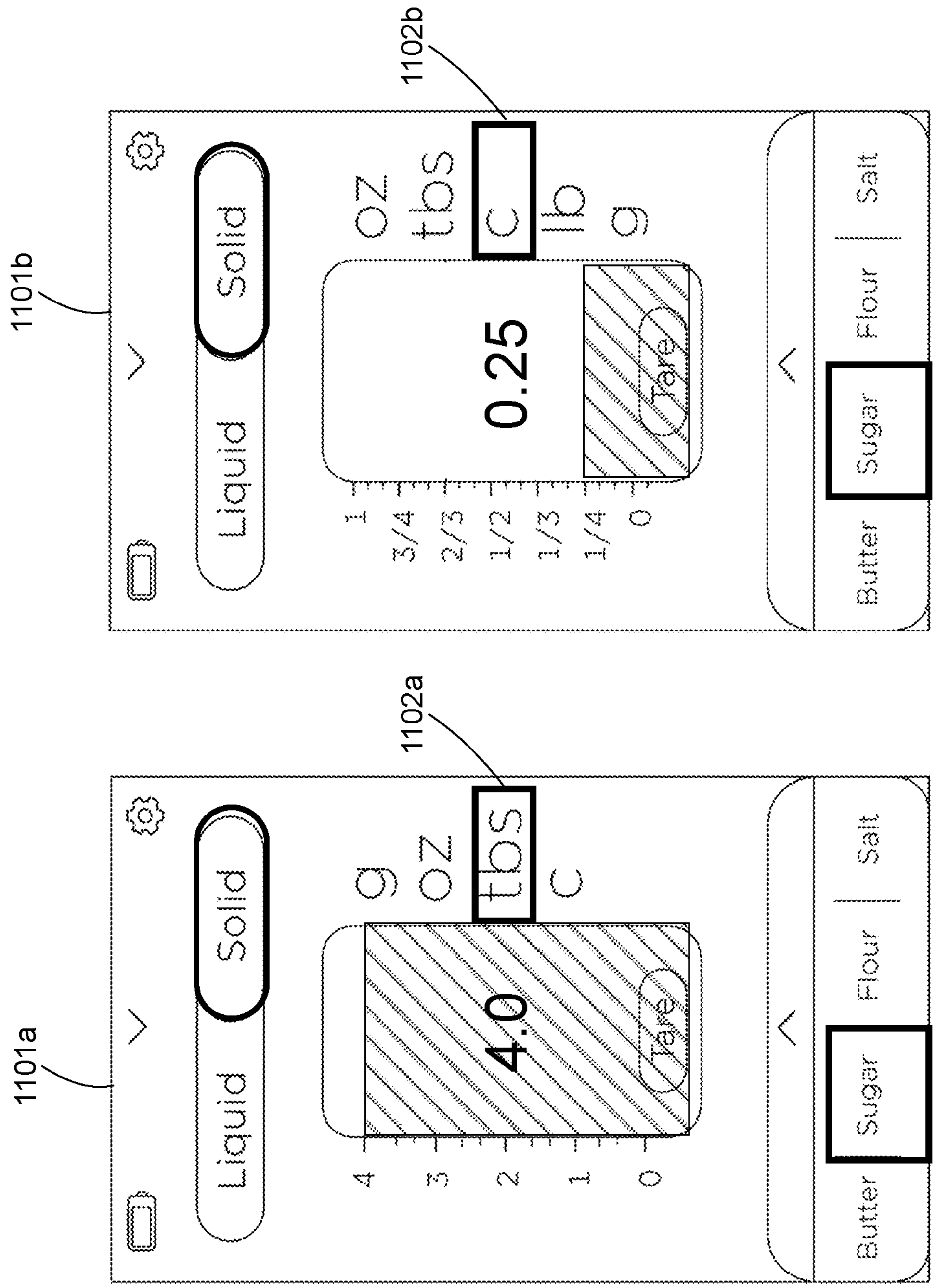
FIG. 11 shows illustrative user interface screens that show selection of units of measure.

FIGS. 9, 10, and 11 show illustrative user interface screens that illustrate some of the processing steps of FIG. 8. These screens may be shown on the device user interface display 104, which may include a touchscreen for user input, for example, or on any external user interface device such as a phone. FIG. 9 illustrates user selection of either solid 902 for left screen 901 or liquid 912 for right screen 911. For the solid selection 902, the user also indicates the specific material 903 to be added, which affects the density as described above. For the liquid selection 912, in one or more embodiments the user may select certain categories of liquids since the viscosity of a liquid may affect calibration of the flow meter; in this example the user selects category 913 for low-viscosity (water-like) liquids. Based on the inputs 902 and 903, the device calculates the volume of solid added and displays this amount 904 textually, graphically, or both; similarly based on inputs 912 and 913, the device calculates the volume of liquid added and displays this amount 914 textually, graphically, or both. These values may be updated dynamically, at any desired update rate, as the user adds additional liquid or solid amounts to the container.

Many different types of solids may be measured, each potentially with its own density. The system may therefore provide an extended selection of options for solids to the user, for example via a dropdown menu activated with button 920. FIG. 10 shows screen 1001 that may be displayed when button 920 is pressed; this screen lets users scroll through many choices for solid materials. In one or more embodiments, common or recently used materials may be shown first, followed by a more extensive list of all possible materials, potentially sorted alphabetically as shown in screen 1001.

FIG. 11 illustrates user selection of units of measure. In screen 1101*a*, the user selects units 1102*a*, and the system calculates the amount of solid added in these units; in screen 1101*b*, the user switches to units 1102*b*, and the system translates the amount into these units. In one or more embodiments, if the quantities exceed "reasonable" values for one set of units, the system may automatically change units and rescale or suggest this option to the user for confirmation. For example, if the user has selected tablespoons as the unit but the quantity is 245.6 tablespoons, the system may suggest showing this as 0.96 gallons instead.

While the invention herein disclosed has been described by means of specific embodiments and applications thereof, numerous modifications and variations could be made thereto by those skilled in the art without departing from the scope of the invention set forth in the claims.

What is claimed is:

1. A kitchen device that measures amounts of liquids or solids added to a mixture, comprising:
- a base configured to support a container containing a mixture;
- a weight sensor integrated into the base that measures a weight of the container and the mixture;
- a vertical support coupled to the base that extends upwards from the base;
- a movable arm coupled to a top of the vertical support that extends horizontally from the vertical support, wherein the movable arm can be extended over the container or retracted to clear space above the container;
- a channel through said movable arm;
- a flow rate sensor proximal to or integrated into said channel that measures a rate of flow of a liquid through said channel;
- a user interface; and
- a processor coupled to the weight sensor, the flow rate sensor, and the user interface, wherein the processor is configured to:
  - measure a quantity of a solid added to the mixture, comprising:
    - receive a selection of a material from the user interface;
    - receive an initial weight measurement from the weight sensor before the solid is added to the mixture;
    - receive a final weight measurement from the weight sensor after the solid is added to the mixture;
    - calculate a weight change as a difference between the final weight measurement and the initial weight measurement;
    - obtain a density of the material from a memory coupled to the processor;
    - calculate a volume of the solid added to the mixture based on the weight change and the density; and
    - transmit the volume of the solid added to the user interface; and,
  - measure a quantity of a liquid added to the mixture through said channel, comprising:
    - receive a sequence of flow measurements over a time period from the flow rate sensor;
    - calculate a volume of the liquid added to the mixture based on the sequence of flow measurements; and
    - transmit the volume of the liquid added to the user interface.

2. The kitchen device that measures amounts of liquids or solids added to a mixture of claim 1, wherein the weight sensor comprises a load cell.

3. The kitchen device that measures amounts of liquids or solids added to a mixture of claim 1, wherein the flow rate sensor comprises one or more of an ultrasonic flow sensor, a paddle wheel flow sensor, and a turbine flow sensor.

4. The kitchen device that measures amounts of liquids or solids added to a mixture of claim 1, wherein the vertical support is extensible.

5. The kitchen device that measures amounts of liquids or solids added to a mixture of claim 1, wherein said channel comprises a flow conditioning structure configured to:

redirect said liquid entering the channel radially outward before said liquid reaches said flow rate sensor;

equalize pressure of said liquid across a cross-section of the channel; and produce a substantially uniform velocity profile said liquid entering the flow rate sensor, independent of a pour rate, aim, or stream characteristics said liquid entering said channel.

6. The kitchen device that measures amounts of liquids or solids added to a mixture of claim 1, wherein:

a top section of said channel comprises a funnel having a bottom funnel opening; and, said flow rate sensor is located below said bottom funnel opening.

7. The kitchen device that measures amounts of liquids or solids added to a mixture of claim 6, further comprising:

a cap located above said bottom funnel opening and configured to deflect liquid poured towards said bottom funnel opening radially outwards; and, a cap base that reduces said bottom funnel opening to an annular opening.

8. The kitchen device that measures amounts of liquids or solids added to a mixture of claim 7, further comprising:

a chamber in said channel below said annular opening configured to equalize pressure of said liquid within said chamber before said liquid continues in said channel towards said flow rate sensor.

9. The kitchen device that measures amounts of liquids or solids added to a mixture of claim 8, wherein:

a bottom of said chamber gradually tapers to a pipe with a pipe diameter smaller than a chamber diameter; and, said flow rate sensor is located below said pipe.

10. The kitchen device that measures amounts of liquids or solids added to a mixture of claim 1, wherein said processor is further configured to:

receive a selection of a liquid type from the user interface; and, calculate the volume of the liquid added to the mixture based on the sequence of flow measurements and based on the liquid type.

11. The kitchen device that measures amounts of liquids or solids added to a mixture of claim 1, wherein said processor is further configured to:

receive a unit of measure from said user interface; and, convert said volume of the liquid added and said volume of the solid added to said unit of measure.

* * * * *